(12) United States Patent
Leblond

(10) Patent No.: US 6,578,590 B2
(45) Date of Patent: Jun. 17, 2003

(54) ROTATIVE CLEANING AND SANITIZING DEVICE

(76) Inventor: Danny Leblond, P.O. Box 1964, Honokaa, HI (US) 96727

( * ) Notice: Subject to any disclaimer, the term of this patent is extended or adjusted under 35 U.S.C. 154(b) by 121 days.

(21) Appl. No.: 09/814,262

(22) Filed: Mar. 21, 2001

(65) Prior Publication Data

US 2002/0166578 A1 Nov. 14, 2002

(51) Int. Cl.$^7$ ................................................. B08B 3/02
(52) U.S. Cl. .................. 134/99.2; 134/138; 134/157; 134/148; 134/200; 134/182
(58) Field of Search ................................. 134/137, 138, 134/157, 148, 200, 182, 183, 99.2, 201

(56) References Cited

U.S. PATENT DOCUMENTS

| | | | |
|---|---|---|---|
| 817,801 A | * | 4/1906 | Pittock |
| 1,665,423 A | * | 4/1928 | Skelton |
| 1,886,578 A | * | 11/1932 | Pedrazzo |
| 2,275,411 A | * | 3/1942 | Ashe |
| 2,543,993 A | * | 3/1951 | Stanitz et al. |
| 2,629,392 A | * | 2/1953 | Davis |
| 2,642,369 A | * | 6/1953 | Hunter et al. |
| 2,767,110 A | * | 10/1956 | Frekko |
| 3,041,212 A | * | 6/1962 | Booth |
| 3,413,827 A | * | 12/1968 | Kochanek |
| 3,448,746 A | * | 6/1969 | Butler |
| 3,456,659 A | * | 7/1969 | Tiby |
| 3,769,992 A | * | 11/1973 | Wallestad |
| 3,874,395 A | * | 4/1975 | Lea |
| 4,007,751 A | * | 2/1977 | Commiant |
| 4,368,748 A | * | 1/1983 | Steimel |
| 4,922,939 A | * | 5/1990 | Adamczyk |
| 5,355,901 A | * | 10/1994 | Mielnik et al. |

FOREIGN PATENT DOCUMENTS

| | | | |
|---|---|---|---|
| DE | 926931 | * | 4/1955 |
| FR | 821438 | * | 8/1937 |

* cited by examiner

Primary Examiner—Frankie L. Stinson
(74) Attorney, Agent, or Firm—Michael I. Kroll

(57) ABSTRACT

The present invention 10 discloses a device for cleaning and sanitizing objects such as food products 86, cartridge filter elements 64 and other such objects that could benefit from the advantages of being circumferentially sprayed with a fluid or a cleaning solution 119 or preferably a combination thereof. The present invention 10 comprises an inner and outer housing body 24, 44, a cover 26 for the housing body, a rotative central member such as a base, axle or shaft 42, a rotative drive means 60 for selectively rotating the rotative member 42, intake means 16 to introduce one or more fluids 119 or solutions individually or in combination into the interior of the housing body 24 including a means for further pressurizing and peripherally directing the resulting spray 130 towards a central point in a specific array, a containment means 66 for placement of such items therein, and an outlet means 18 to provide for the removal of fluid from the housing.

26 Claims, 15 Drawing Sheets

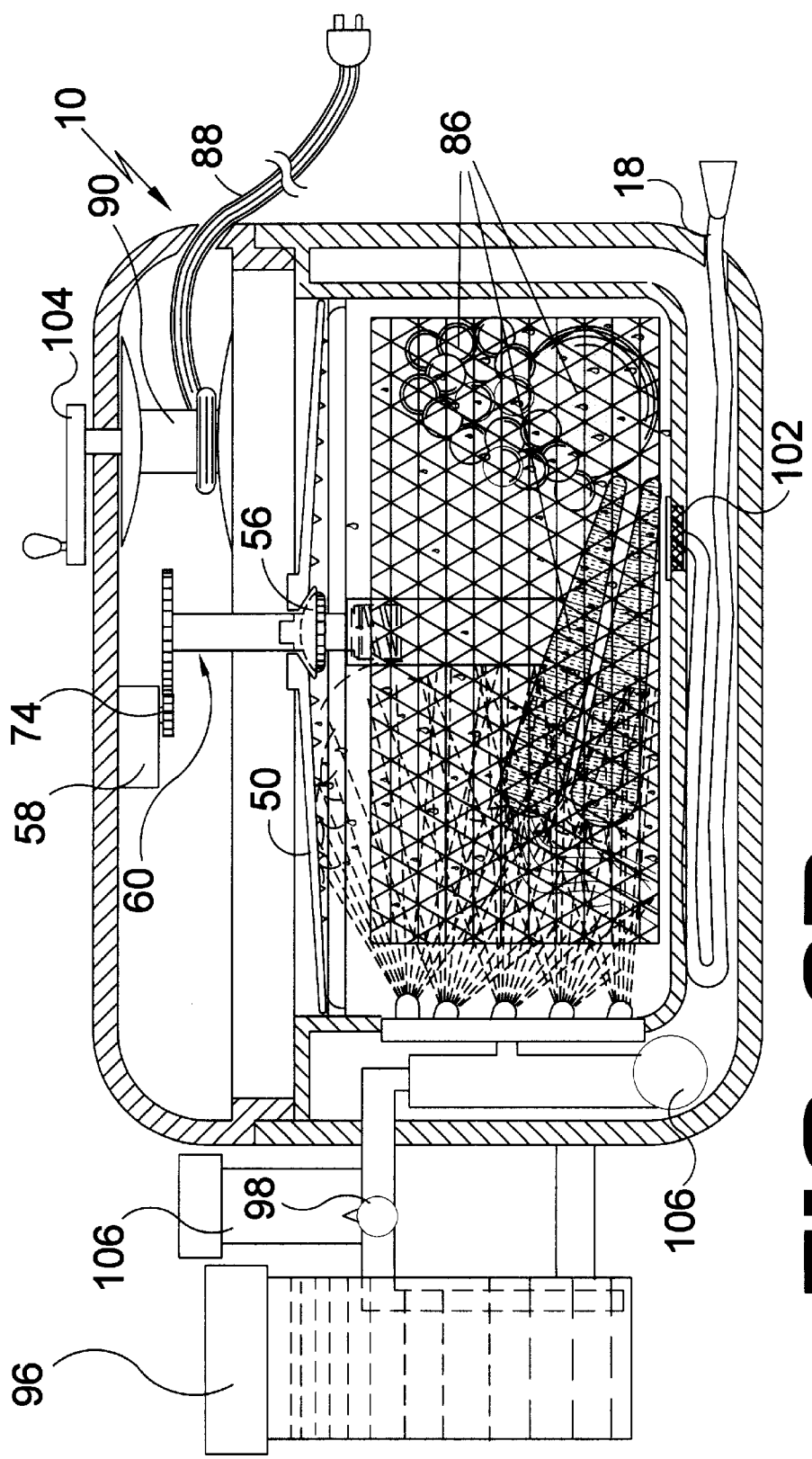

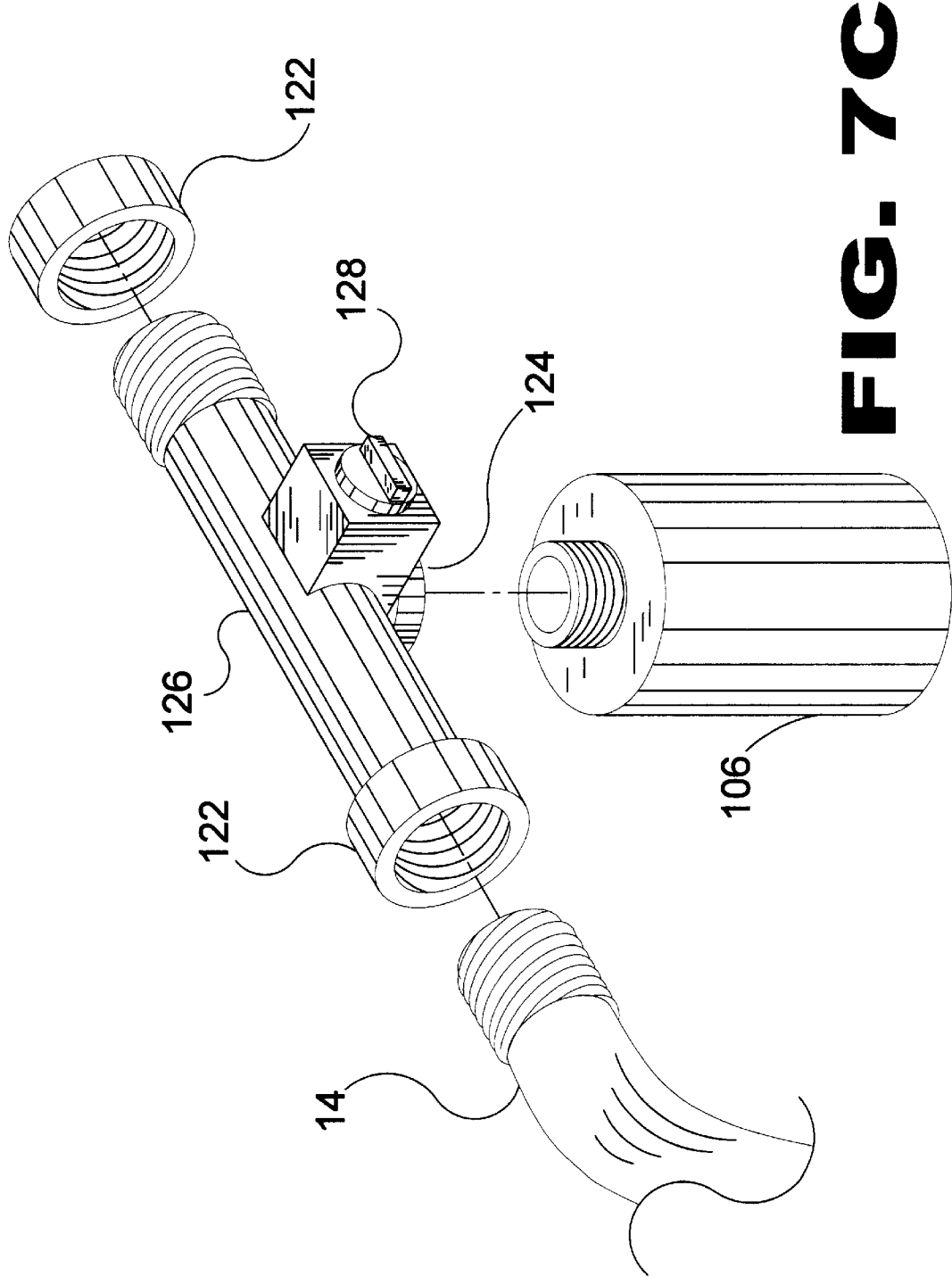

ROTATIVE CLEANING AND SANITIZING DEVICE

BACKGROUND OF THE INVENTION

1. Field of the Invention

The present invention relates generally to cleaning devices, and more specifically, to a device for housing and rotatively cleaning and sanitizing objects such as food products, cartridge filter elements and other such applications that could benefit from the advantages of being circumferentially sprayed with a liquid, a cleaning solution or preferably a combination thereof. The present invention comprises: a housing body; a cover for said housing body; a rotative member such as a base, axle or shaft; a rotative means for selectively rotating said rotative member; intake means to introduce one or more fluids or solutions individually or in combination into the interior of said housing body including a means for further pressurizing and peripherally directing the resulting spray towards a central point in a specific array; an engagement means to communicate the influence of said rotative member upon the item to be cleaned or a containment means for placement of such items therein; and an egress means to provide for the removal of fluid.

Many foods, particularly fruits and vegetables, are exposed to pesticides and other potentially harmful toxins thereby making the thorough washing of fruits and vegetables critical in order to remove those toxins therefrom prior to human consumption. Furthermore, many restaurants, hotels, and other food preparation institutions including residential users have incorporated policies that require a cleaning agent or sanitizing solution to be used in addition to water for increasing the detoxification properties of the wash. The availability of fruit and vegetable wash solutions for this specific purpose has increased dramatically in recent years and the present invention will provide a safe, easy-to-use rotative cleaning and sanitizing device that will maximize the efficiency of said vegetable wash solutions in a cost-effective manner.

Additionally, the present invention is configured to accommodate cartridge filter elements of varying sizes. Cleaning filter cartridge elements for pools, spas and other applications can be a frustrating and messy task. A garden hose is commonly used to remove dirt, debris, grime etc. from the pleats of accordion folded filter elements resulting in backsplash and over spray that is messy and annoying. The present invention provides a self-contained unit for cleaning cartridge filter elements without splashing or wasting resources by over spraying and also has a means for directing the wastewater to a specific area. The present invention can be adapted to utilize a plurality of fluids or solutions to suit the varying needs of commercial and residential users. The present invention can provide all the elements necessary for acid washing a cartridge filter element including: a water source; a reservoir containing muriatic acid; a reservoir with a degreasing agent; and a means for distributing a buffer into the bottom of the housing to neutralize the acid as it approaches the waste line.

2. Description of the Prior Art

There are numerous types of cleaning devices, while these cleaning devices may be suitable for the purposes for which they were designed, they would not be as suitable for the purposes of the present invention as hereinafter described.

SUMMARY OF THE PRESENT INVENTION

The present invention discloses a device for cleaning and sanitizing objects such as food products, cartridge filter elements and other such objects that could benefit from the advantages of being circumferentially sprayed with a fluid or a cleaning solution or preferably a combination thereof. The present invention comprises an inner and outer housing body, a cover for the housing body, a rotative central member such as a base, axle or shaft, a rotative drive means for selectively rotating the rotative member, intake means to introduce one or more fluids or solutions individually or in combination into the interior of the housing body including a means for further pressurizing and peripherally directing the resulting spray towards a central point in a specific array, a containment means for placement of such items therein, and an outlet means to provide for the removal of fluid from the housing.

A primary object of the present invention is to provide a rotative cleaning and sanitizing device in which an object or objects can be placed into a housing and receive a focused 360 degree circumferential spray of a liquid without making a mess or causing discomfort or annoyance to the user due to backsplash or over spray, An additional object of the present invention is to provide a rotative cleaning and sanitizing device having a rotative means that is motorized.

A further object of the present invention is to provide a rotative cleaning and sanitizing device that provides at least one series of pressurized nozzles, preferably in a vertical linear array.

A yet further object of the present invention is to provide a rotative cleaning and sanitizing device wherein the pressure nozzle array provides an overlapping, vertical fan-like spray with 360-degree circumferential coverage by remaining stationary as the item to be cleaned revolves.

Another object of the present invention is to provide a rotative cleaning and sanitizing system wherein the rotating member is configured to accommodate and rotate a cartridge filter element slowly enough to allow the vertical fan-like spray to thoroughly clean between the accordion-like pleats thereof.

Still another object of the present invention is to provide a rotative cleaning and sanitizing device that conserves water.

One more object of the present invention is to provide a rotative cleaning and sanitizing device having the capability of providing one or more fluids or solutions and a means for selectively delivering said fluids and solution to the item or items to be cleaned.

A further object of the present invention is to provide a rotative cleaning and sanitizing device having a means for securing the cleaning basket or filter element to the turntable so as to respond to the movement of the rotational shaft preferably using an interlocking system such as securing clips, the splash guard or a locking nut.

A still further object of the present invention is to provide a rotative cleaning and sanitizing device having integrated reservoirs for water and/or solutions and at least one pump that would permit the present invention to operate independently from external water sources that might not be available or in the event of low pressure situations which might not be conducive to optimum performance.

Another object of the present invention is to provide a free wheeling rotatable seal on the disengageable shaft wherein the spring mechanism provides a bias against the cover to prevent fluid from entering the motor housing through the shaft recess.

Another object of the present invention is to provide a rotative cleaning and sanitizing device having a secondary sanitizing means besides spraying that may include but is not limited to electrolyzed water, ozone, and U.V. light.

Still another object of the present invention is to provide a rotative cleaning and sanitizing device that may be adapted for various uses and applications such as a space-saving wall-mounted unit that may be plumbed directly into the house's water supply and drain system or a large commercial model having a plurality of stackable baskets and a macerator for pulverizing any debris approaching the drain system that might otherwise clog up a strainer basket.

One other object of the present invention is to provide a rotative cleaning and sanitizing device wherein the cleaning solutions may be contained within replaceable dispenser cartridges that will allow a user to easily replace or switch solutions.

Another object of the present invention is to provide a rotative cleaning and sanitizing device having a control panel for monitoring and operating any of the attendant features that are included with the unit and may include any number of LED status indicator lights, audible alarms, timers etc.

Yet another object of the present invention is to provide a rotatative cleaning and sanitizing device that is simple and easy to use.

Yet another object of the present invention is to provide a rotative cleaning and sanitizing device that is economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 6B is a cross-sectional side view of the present invention.

FIG. 7C is an exploded perspective view of an adapter for using additional fluids.

Figure 1:
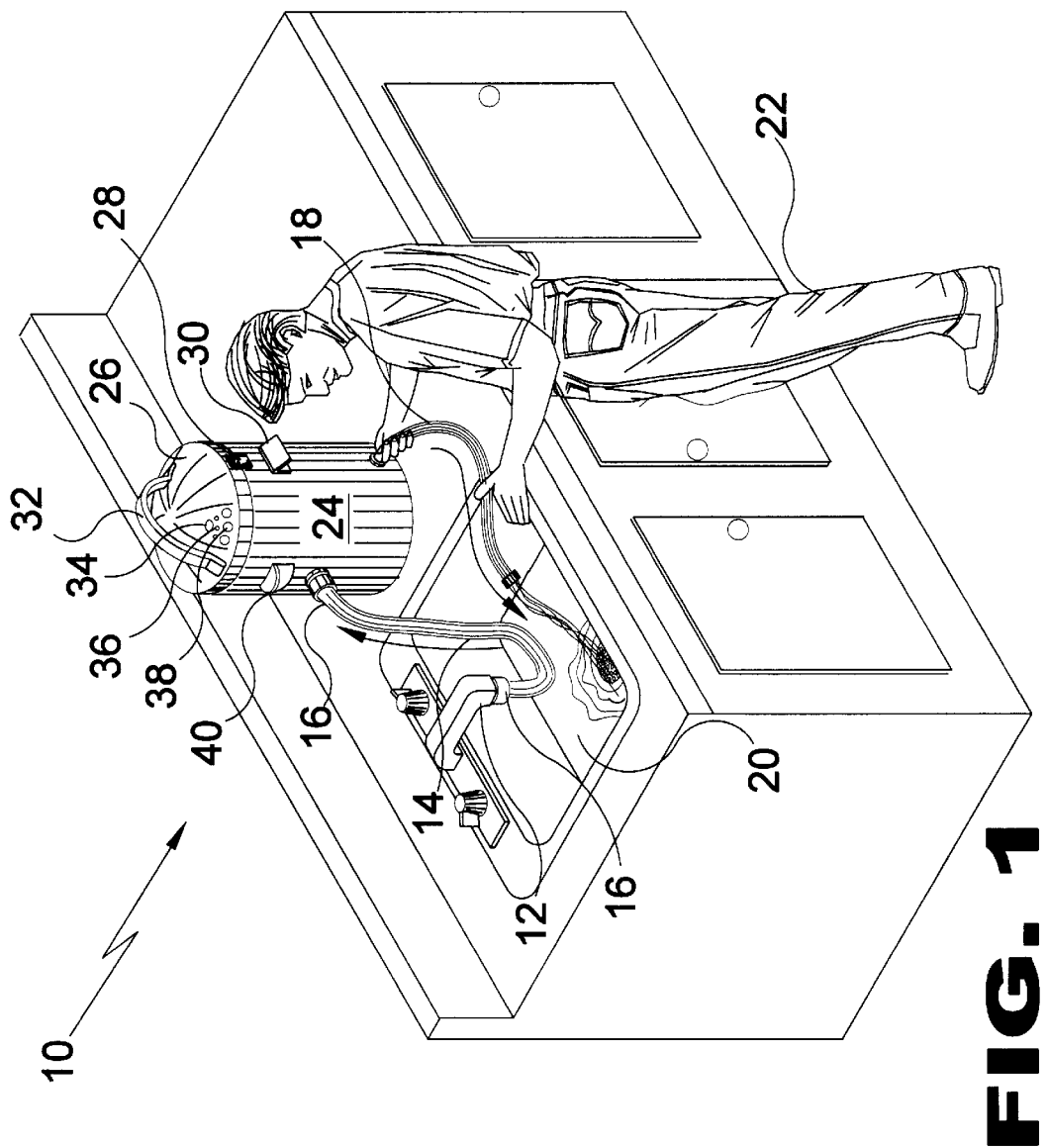
FIG. 1 is a perspective view of the present invention.

LIST OF REFERENCE NUMERALS
With regard to reference numerals used,
the following numbering is used throughout the drawings.

| | |
|---|---|
| 10 | present invention |
| 12 | water source |
| 14 | intake hose |
| 16 | quick connect fitting |
| 18 | waste hose |
| 20 | sink drain |
| 22 | user |
| 24 | housing body |
| 26 | cover |
| 28 | latch for cover |
| 30 | handle for housing |
| 32 | handle for cover |
| 34 | audible alarm |
| 36 | LED mode indicators |
| 37 | control panel |
| 38 | control buttons |
| 40 | cleaning solution dispenser |
| 42 | rotating shaft |
| 44 | tub |
| 46 | turntable |
| 48 | ball bearings |
| 50 | splash guard |
| 52 | splash guard exterior threads |
| 54 | flange |
| 56 | rotatable seal |
| 58 | motor |
| 60 | rotating shaft |
| 62 | locking recess |
| 64 | filter element |
| 66 | cleaning basket |
| 68 | roller brush |
| 70 | spring |
| 74 | drive gear |
| 75 | differential gear |
| 76 | anti-spin flange |
| 78 | retaining plate for splashguard |
| 80 | water conduit |
| 82 | pressure nozzle |
| 84 | interior threads |
| 86 | foodstuff |
| 88 | power cord |
| 90 | spool for power cord |
| 92 | timer |
| 94 | time and relay switch |
| 96 | water reservoir |
| 98 | control knob |
| 100 | pump |
| 102 | drain strainer |
| 104 | cord winder |
| 106 | reservoir for cleaner fluid |
| 108 | drain valve |
| 110 | high water sensor |
| 112 | intake valve |
| 114 | overflow valve |
| 116 | central mounting shaft |
| 119 | fluid |
| 120 | vents |
| 122 | hose receptacle |
| 124 | receptacle for fluid reservoir |
| 126 | connection pipe |
| 128 | valve control |
| 130 | jet spray |
| 132 | pleats |
| 134 | handle |

-continued

LIST OF REFERENCE NUMERALS
With regard to reference numerals used,
the following numbering is used throughout the drawings.

| | |
|---|---|
| 136 | rotating vertical nozzle |
| 138 | rotating horizontal nozzle |
| 140 | macerator |
| 142 | rotating vertical nozzle |
| 143 | rotating shaft |
| 144 | rotating armature |
| 146 | stationary basket retaining member |
| 148 | secondary sanitizing means |

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Turning to FIG. 1, shown therein is a perspective view of the present invention 10 in use by user 22 showing the fluid intake valve of the present invention hooked up to the water source 12 via an intake hose 14 with quick connect fittings 16 and the waste line or hose 18 directed into the sink drain 20. Shown is the housing body 24 being a generally cylindrical upstanding body having a cover 26 thereon along with a cover latch 28 with electrical contacts to insure that the unit does not operate without the cover 26 being properly secured. Also shown are body handles 30, a cover handle 32, an audible alarm 34, an LED mode indicator 36, multiple control buttons 38 along with a cleaning solution dispenser 40.

Figure 2:
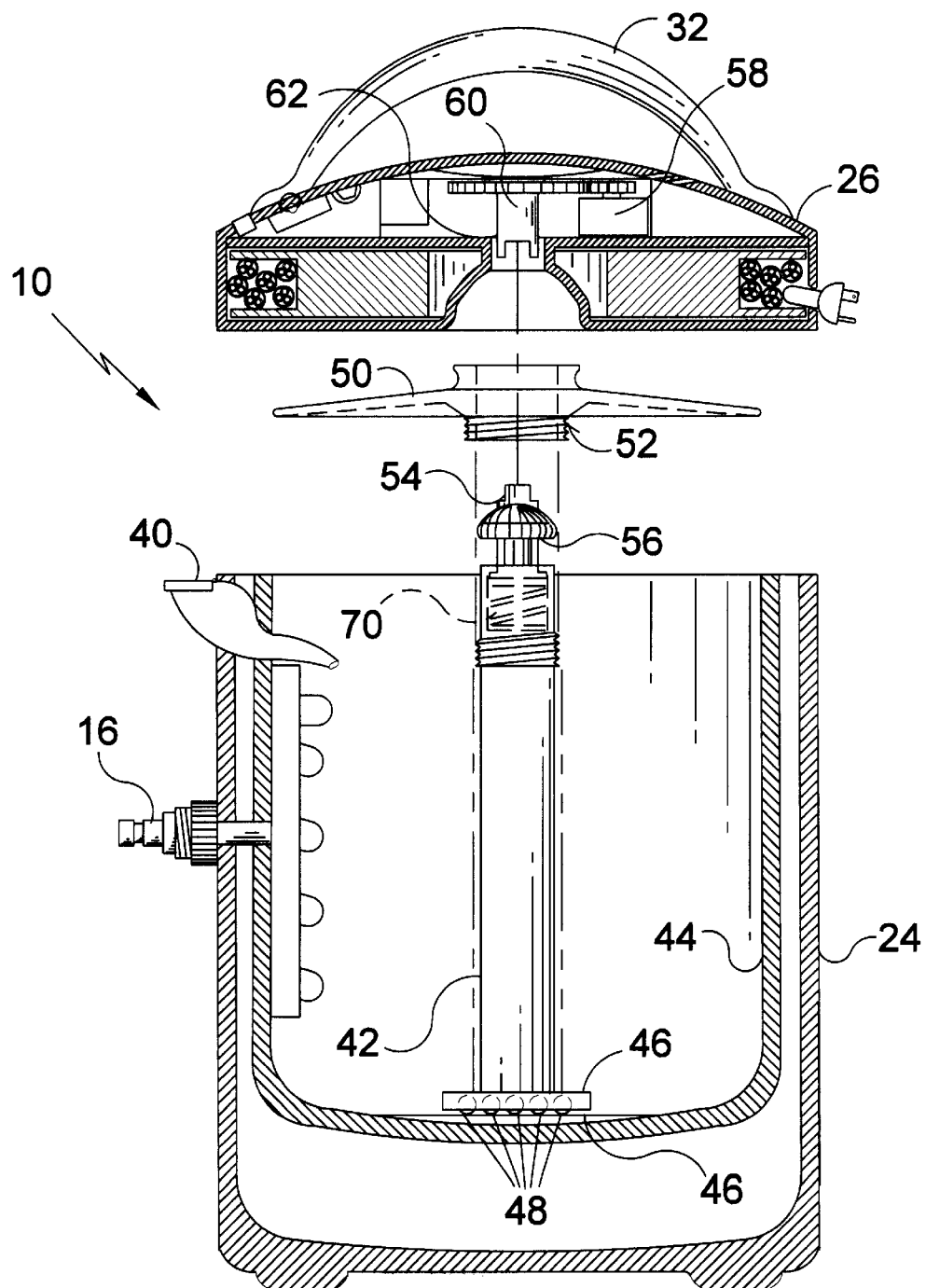
FIG. 2 is an exploded cross-sectional view of the present invention.

Turning to FIG. 2, shown therein is an exploded cross-sectional view of the present invention 10 showing the inter-relationship of the various rotative and cleaning members. Shown is the outer housing body 24 having a cover 26 with a handle 32 disposed on its top side. Shown internal of the housing body 24 is a rotatable shaft 42 being generally upright standing mounted within an inner tub 44 with a shaft 42 having a lower turntable 46 and a plurality of ball bearings 48 upon which to rotate. Shown on the upper end of the rotating shaft 42 is a splash guard 50 having reverse exterior threads 52 designed to accept an adapter to hold down smaller objects which will be described later, along with a spring loaded locking flange 54 for the rotating shaft 42 and a rotatable seal 56. Shown internal of the cover 26 are a motor 58 along with the rotational drive shaft 60 having a locking recess 62 on its end for contacting the rotating shaft 42 and locking flange 54. Also shown are a cleaning solution dispenser 40 and a quick connect fitting 16 or adapter 16. Spring 70 is also shown.

Figure 3:
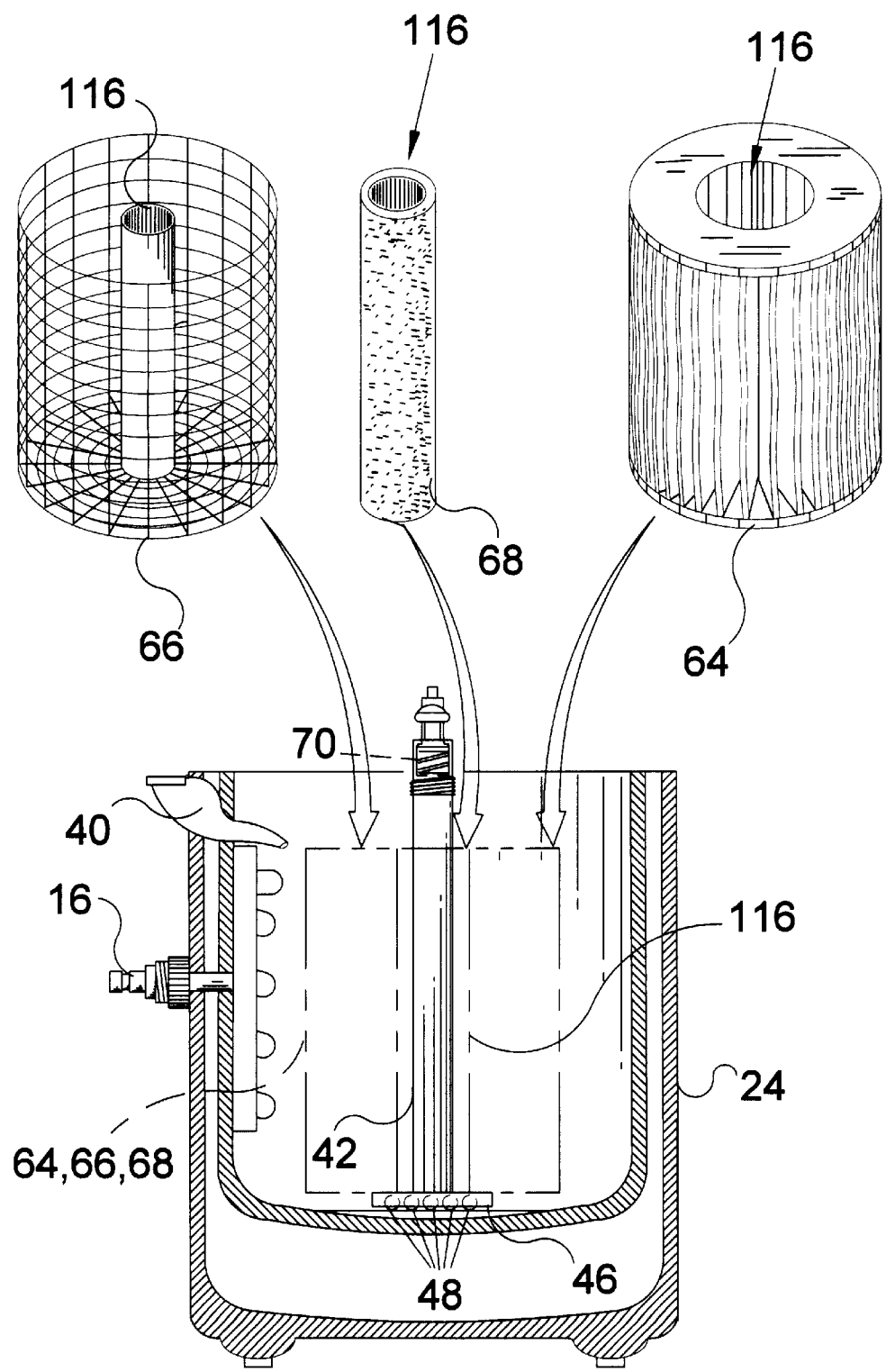
FIG. 3 is a cross-sectional view of the housing body.

Turning to FIG. 3, shown therein is a cross-sectional side view of the body 24 of the present invention showing a filter element 64 with central mounting shaft or cylinder 116, a cleaning basket 66 with central mounting shaft or cylinder 116 and a paint roller brush 68 with shaft 116 that could be placed over the rotating shaft 42 to be cleaned. An adapter could also be included which would allow a plurality of roller brushes 68 to be placed inside the unit so as to have them rotate around the central shaft 42. A cleaning solution dispenser 40 is shown along with other elements previously disclosed.

Figure 4:
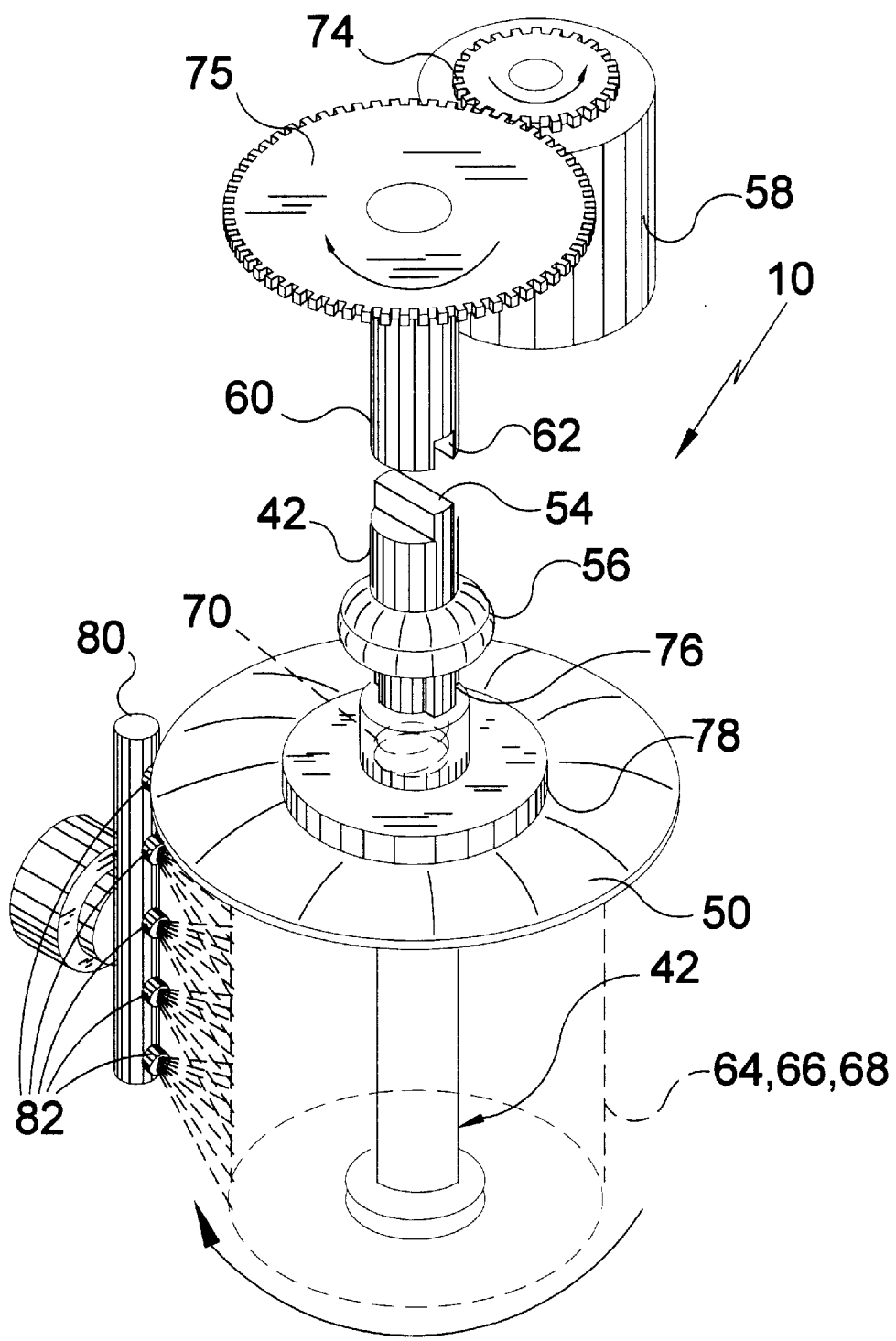
FIG. 4 is an illustrative view of the spraying and rotational systems of the present invention.

Turning to FIG. 4, shown therein is a perspective view of the spraying and rotative systems of the present invention 10 illustrating the relations of the integral components. The disengagable shaft assembly has a motor-driven rotational drive shaft member 60 that acts upon a mating spring-loaded rotating shaft member 42. The locking flange 54 of the rotating shaft 42 engages the locking recess 62 of the rotational drive shaft 60 when the cover is secured onto the body. The rotating shaft 42 is spring loaded 70 and will retract in situations when the locking recess 62 is misaligned with the locking flange 54 until the rotational drive shaft 60 rotates into an aligned position which would allow the spring bias to engage the two shaft members 42, 60. The rotatable seal 56 spins freely on the rotating shaft 42 assembly and forms a water tight seal against the underside of the cover 26 (not shown) to prevent fluid from entering the shaft recess 62 where the motor 58 and control systems are located. Also shown are a pair of gears being a drive gear 74 mounted on the motor 58 and a differential drive gear 75 mounted on the rotating shaft 60 which provides the rotative means for turning the drive shaft 60 and, thereby, the shaft or rotative member 60. Also shown is an anti-spin flange 76 along with a splashguard 50 and retaining plate 78 for the splashguard. Also shown is a water conduit 80 along with a plurality of pressure nozzles 82 which are mounted in a vertical, linear array which provide means to introduce one or more fluids or solutions, individually or in combination, into the interior of the housing body including a nozzle means 82 for further pressurizing and directing the resulting spray toward a central point internal the body.

Figure 5:
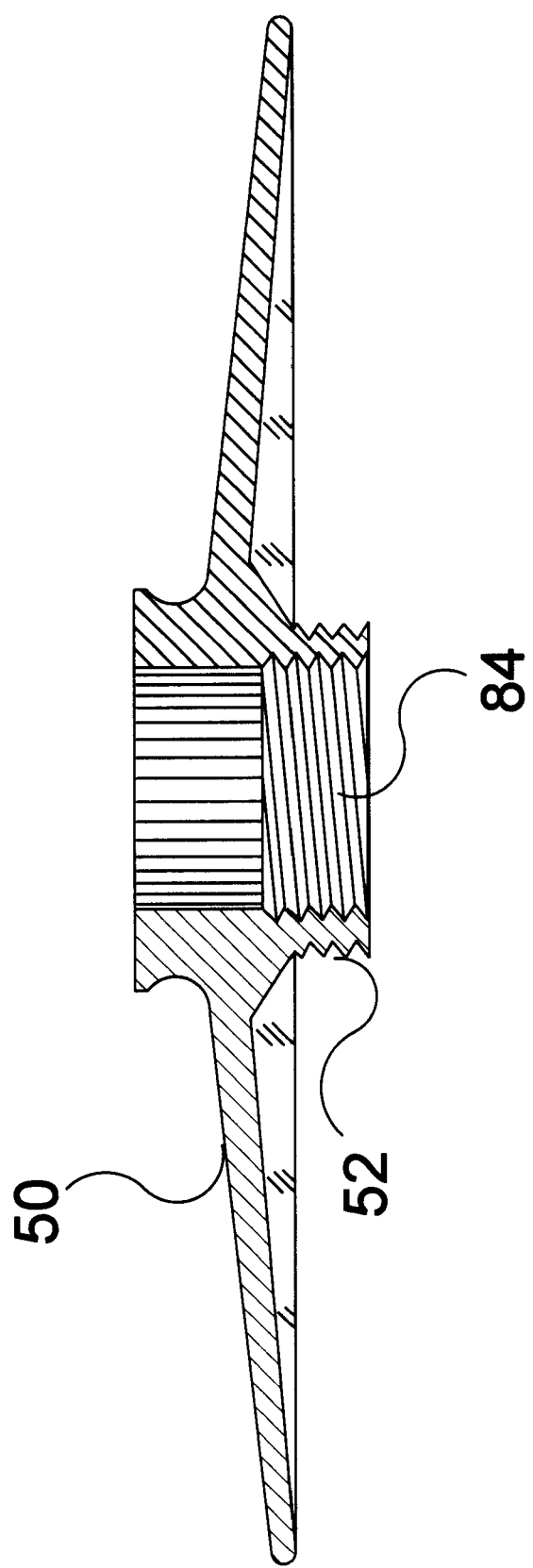
FIG. 5 is a cross-sectional side view of the splashguard of the present invention.

Turning to FIG. 5, shown therein is a cross-sectional side view of the splash guard 50 wherein the interior shaft threads 84 fasten the splash guard to the shaft 42 and secure the filter element 64 (not shown) or cleaning basket 66 (not shown) by tightening it down between the splash guard and the turntable 46 (not shown). The exterior threads 52 are reverse threaded and are used for attaching an adapter in the event that a smaller filter element is to be cleaned. The adapter will extend downward to compensate for the difference in height. The splashguard 50 could also be manufactured or adapted to snap or screw onto the bottom of the cover 26 (not shown) or could be integrated thereon. A nut would then be used to secure the cleaning basket 66 or filter element 64 down to the turntable 46.

Figure 6:
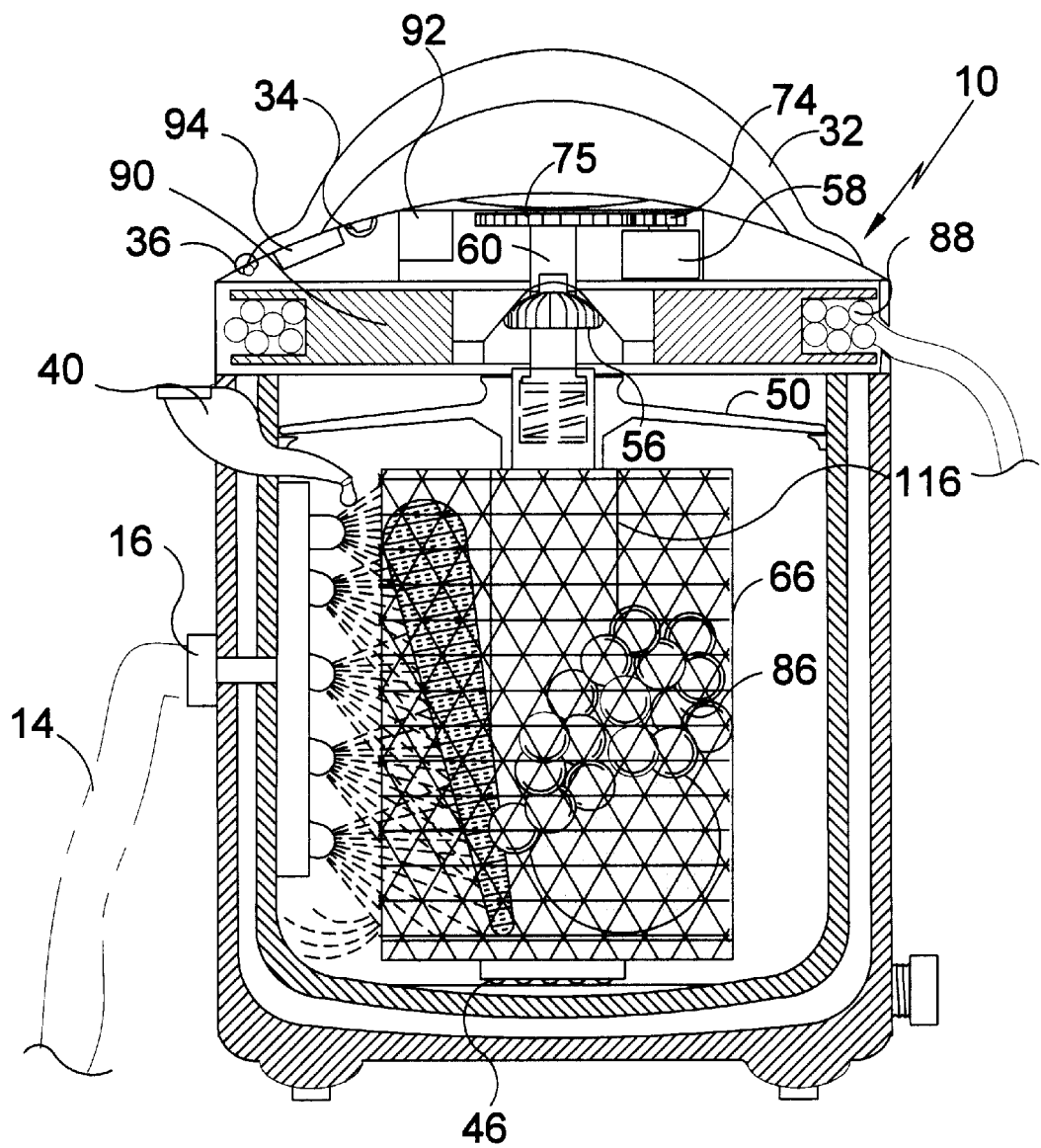
FIG. 6 is a cross-sectional side view of the present invention in use cleaning food.

Turning to FIG. 6, shown therein is a cross-sectional side view of the present invention 10 cleaning fruit, vegetables or other foodstuffs 86 inside a basket 66 that has a central cylinder 116 that slides over the rotating shaft and is secured between the splashguard 50 and the turntable 46. A fruit and vegetable cleaning solution is placed in the cleaning solution dispenser 40. Also shown is the rotational drive shaft 60 along with the rotatable seal 56. Also shown is a quartz motor 58 along with motor drive gears 74 and a differential gear 75. Additionally, there is shown a retractable power cord 88 and a spool 90 upon which the power cord is retractable. Also shown is a timer 92 along with an audible alarm 34, timer and relay switch 94 and an LED mode indicator 36. Additionally, there is shown the cover handle 32 and a fluid intake hose 14 with quick connect coupling 16.

Figure 6A:
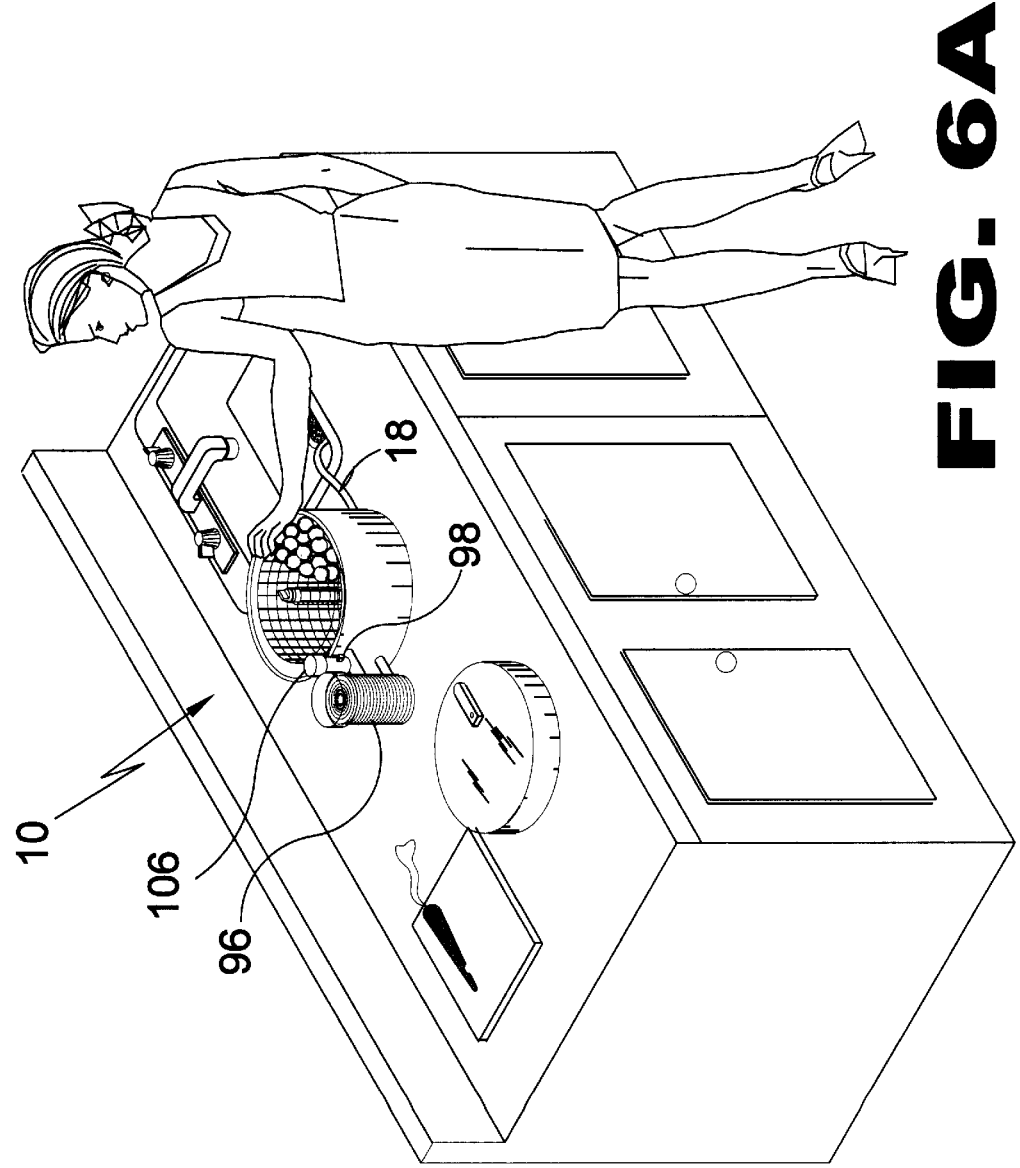
FIG. 6A is a perspective view of the present invention in use.

Turning to FIG. 6A, shown therein is a perspective view of the present invention 10 in use having an internal pump and an independent external water supply with a dual reservoir system for selectively mixing water from a reservoir 96 with a cleansing solution in dispenser reservoir 106 using control knob means 98. Waste line 18 is also shown. The reservoirs could also be manufactured integrated within the body of the device for convenience and aesthetic purposes. Furthermore, a recirculation reservoir could be included in the bottom of the unit to recycle water and cleanser back to the pressure nozzles when not being used for edible items.

Turning to FIG. 6B, shown therein is a cross-sectional side view of the present invention 10 in use and having an independent water supply and an internal pump 100 with controls to selectively transport one fluid or a combination thereof to the pressure nozzles 82 for delivery to the food 86 therein. A flexible drain hose 18 is maintained within the body when not in use and could be capped to prevent leaking. A higher rate of rotation can be applied to provide a spin cycle to enhance drying the food although a fan or other drying means may be included. The present invention could also be configured so the axial rotation of the cleaning basket would act as a tumbler to further enhance the cleaning and drying properties. Also shown is a drain strainer 102 along with a manual cord winder 104 which could also be automatic. Other elements previously disclosed are also shown.

Figure 7:
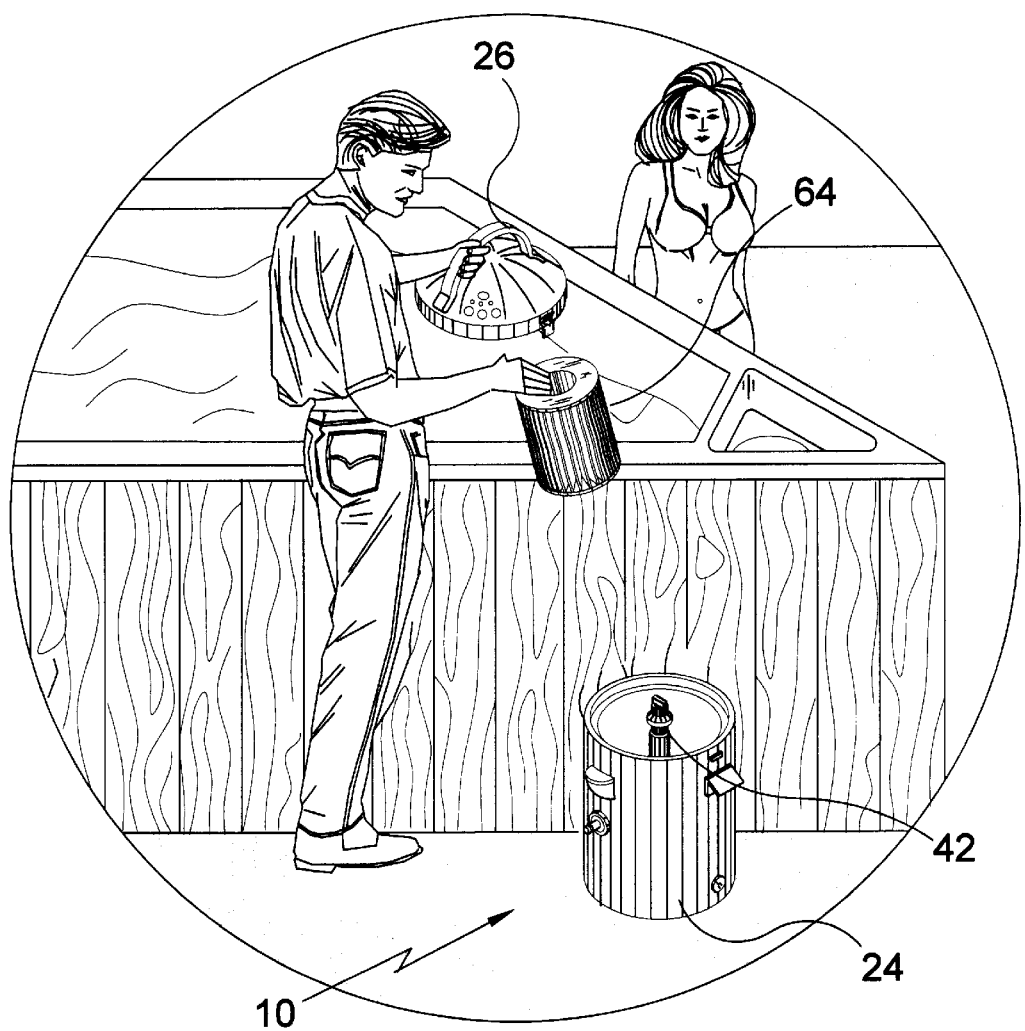
FIG. 7 is a perspective view of the present invention in use.

Turning to FIG. 7, shown therein is a perspective view of the present invention 10 in use to clean a cartridge filter element 64. Other elements previously disclosed are also shown.

Figure 7A:
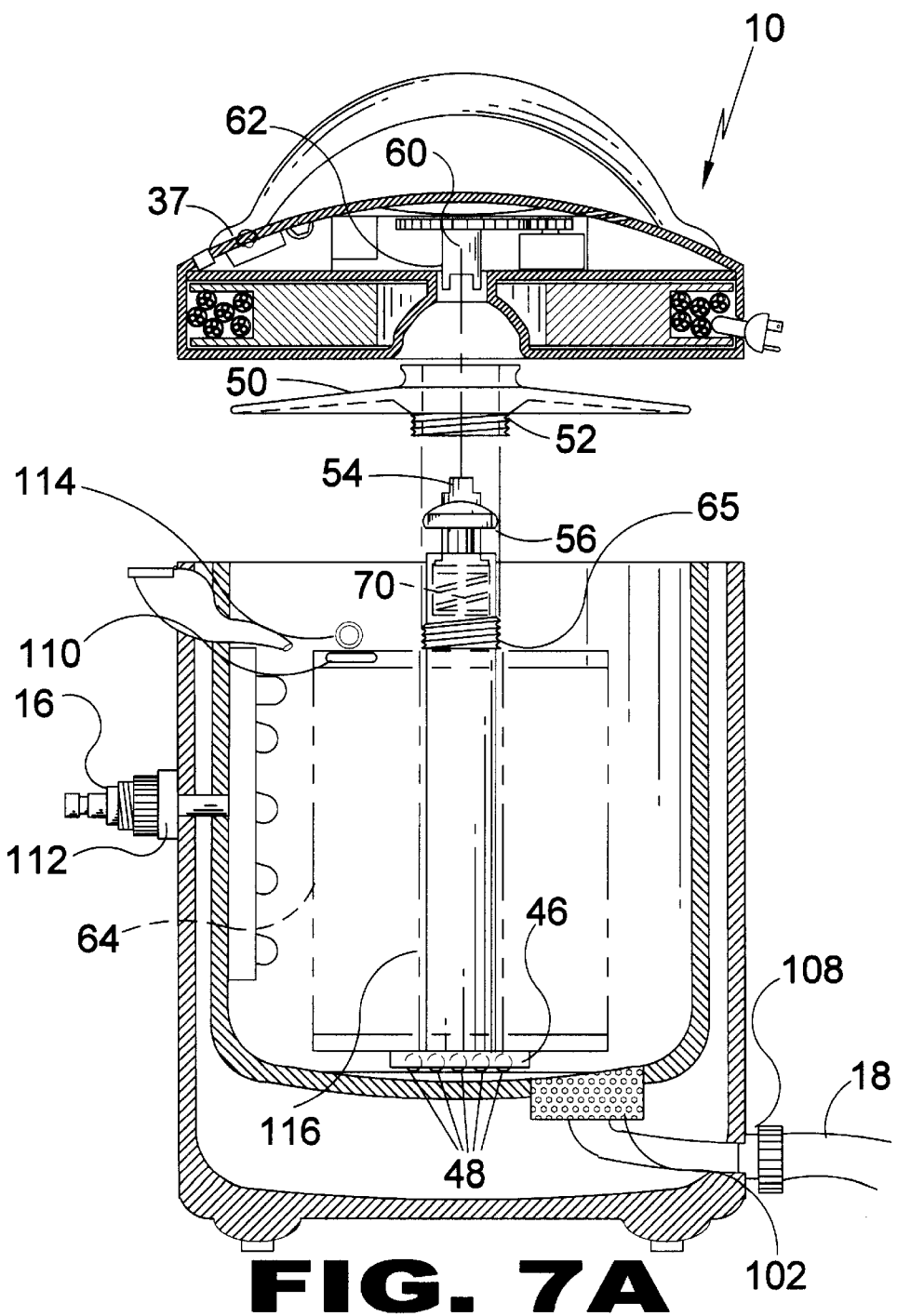
FIG. 7A is a cross-sectional side view of the present invention.

Turning to FIG. 7A, shown therein is a cross-sectional side view of the present invention 10 showing the filter cartridge 64 in phantom line. Once the filter cartridge 64 is in place the splashguard 50 is screwed onto the threads 65 of the filter shaft 116. The electrical drain valve 108 may remain closed in the event that the soaking of the item to be cleaned is desired. A high limit water sensor 110 detects when the water level has reached a predetermined height and sends a signal to close the electrical intake valve 112 and open the overflow valve 114. The rotation of the filter while soaking provides agitation of the cleaning solution. An electrically operated drain valve 108 can also be included to provide automatic draining of the unit once a selectively predetermined period has passed as controlled by the timer thereby providing the present invention the capability of cycling to rinse, wash, soak, spin etc. when using one or more fluids. A control panel 37 with control buttons is included to allow a user to operate and monitor the present invention 10 prior to and during operation. An entire wash cycle using different fluids and functions such as spray, soak etc. could be programmed into the control panel 37 and the water source and drain hose can be set up to allow for unattended operation of the present invention. Other elements previously disclosed are also shown.

Figure 7B:
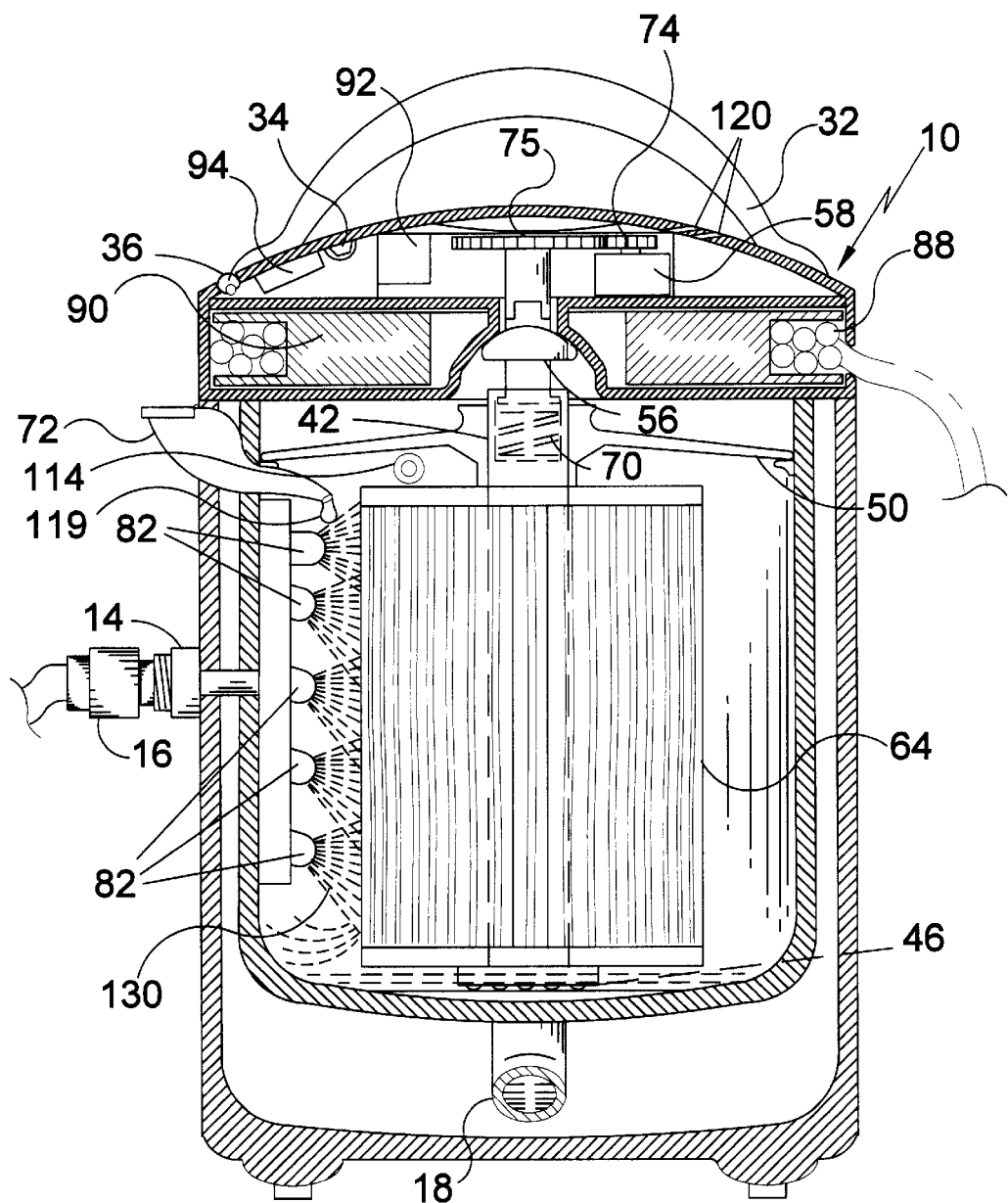
FIG. 7B is a cross-sectional side view of the present invention.

Turning to FIG. 7B, shown therein is a cross-sectional view of the present invention 10 in use showing the filter 64 secured into place by means of the splashguard 50 which is threaded onto the rotating shaft 42. A motor 58 turns the shaft assembly thereby rotating the filter 64. Pressurized water is introduced into the system via a plurality of pressure nozzles 82 in a vertical linear array directed centrally towards the rotating filter 64. The pressure nozzles 82 emit overlapping fanlike jet streams 130 of water which mixes with cleaning fluid 119 to produce a continuous vertical jet stream to facilitate cleaning between the pleats of the cartridge 82. The quartz motor 58 rotates the cartridge filter 64 slowly and incrementally to assure complete coverage between each pleat although other drive systems could be used such as a variable speed motor that could also speed up to use centrifugal force to extract fluid from the cartridge 64. Also shown are cover vents 120. Other elements previously disclosed are also shown.

Turning to FIG. 7C, shown therein is an exploded view of an adapter that could be screwed onto the fluid intake valve of the present invention to allow a user to introduce and regulate one or more cleaning agents and provide additional cleaning ability. The adapter may be used and adapted to maximize the potential of the present invention for commercial use. Shown are the intake hose 14 with mating hose receptacle 122 having a cleaning fluid reservoir 106 with mating container receptacle 124 with a connection pipe 126 with metering valve control 128 and an outlet hose receptacle 122.

Figure 8:
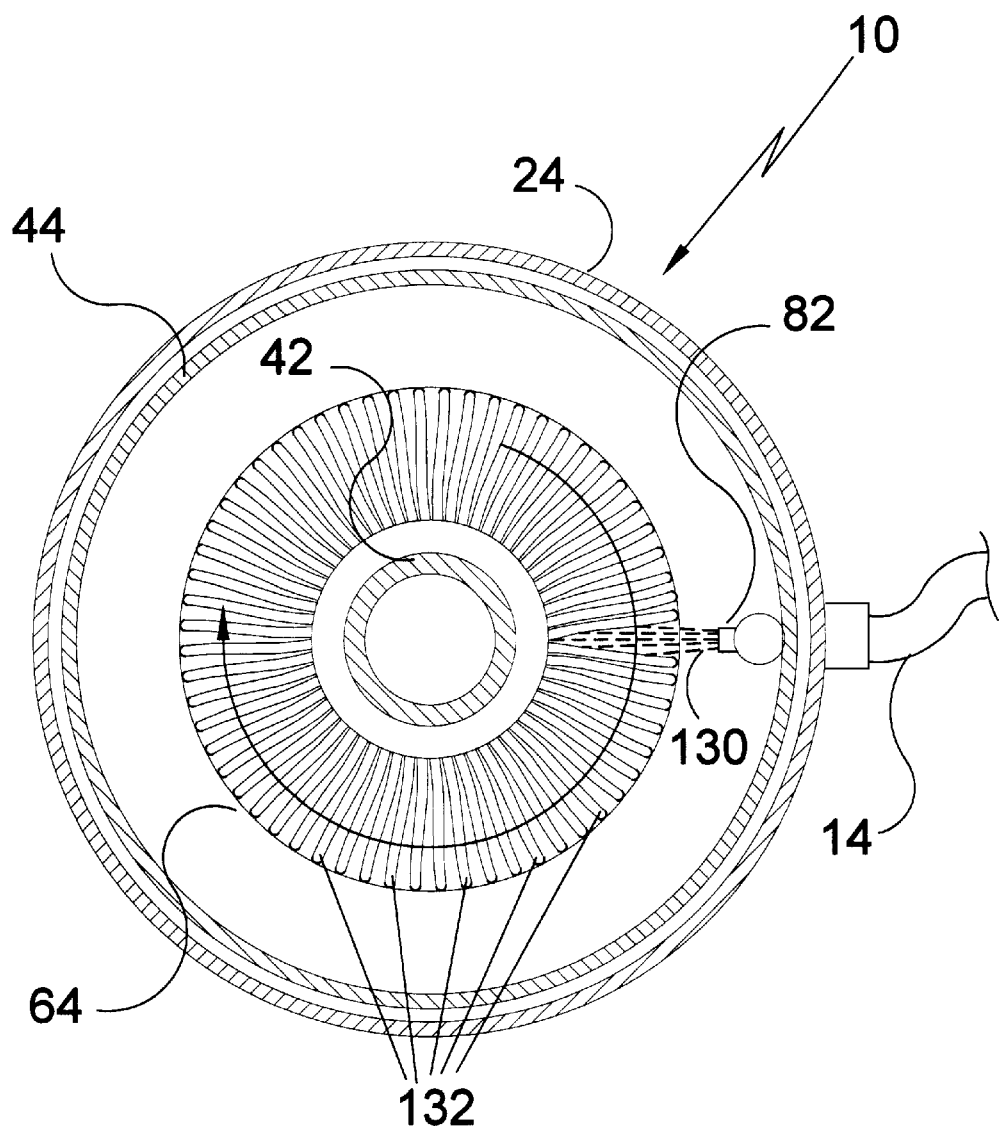
FIG. 8 is a cross-sectional top view of the present invention cleaning a filter element.

Turning to FIG. 8, shown therein is a cross-sectional top view of the present invention 10 demonstrating the cleansing action of the pressurized jet spray 130 as it provides complete longitudinal pressure washing between the pleats 132 of the filter cartridge 64 as the filter cartridge slowly rotates with the rotative shaft 42 thereby effectively cleaning between each and every pleat.

Figure 9:
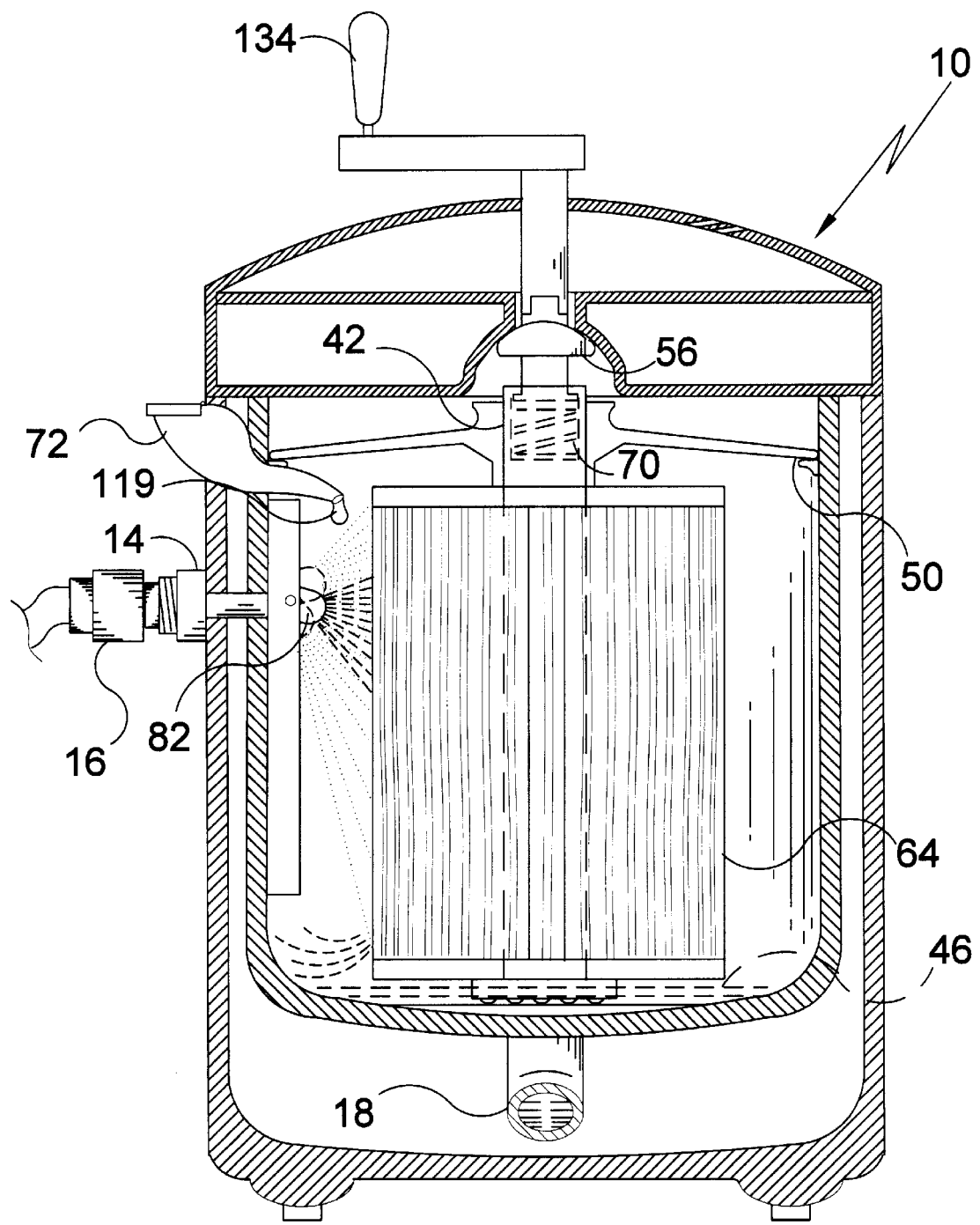
FIG. 9 is a cross-sectional side view of the present invention in use.

Turning to FIG. 9, shown therein is a cross-sectional view of the present invention 10 in use showing a manual embodiment of the present invention whereby the rotation of the disengageable shaft assembly occurs when the user manually turns the handle 134. An oscillating pressure nozzle 82 provides greater coverage per nozzle and could best be utilized when fewer nozzles are used. Other elements previously disclosed are also shown.

Figure 10:
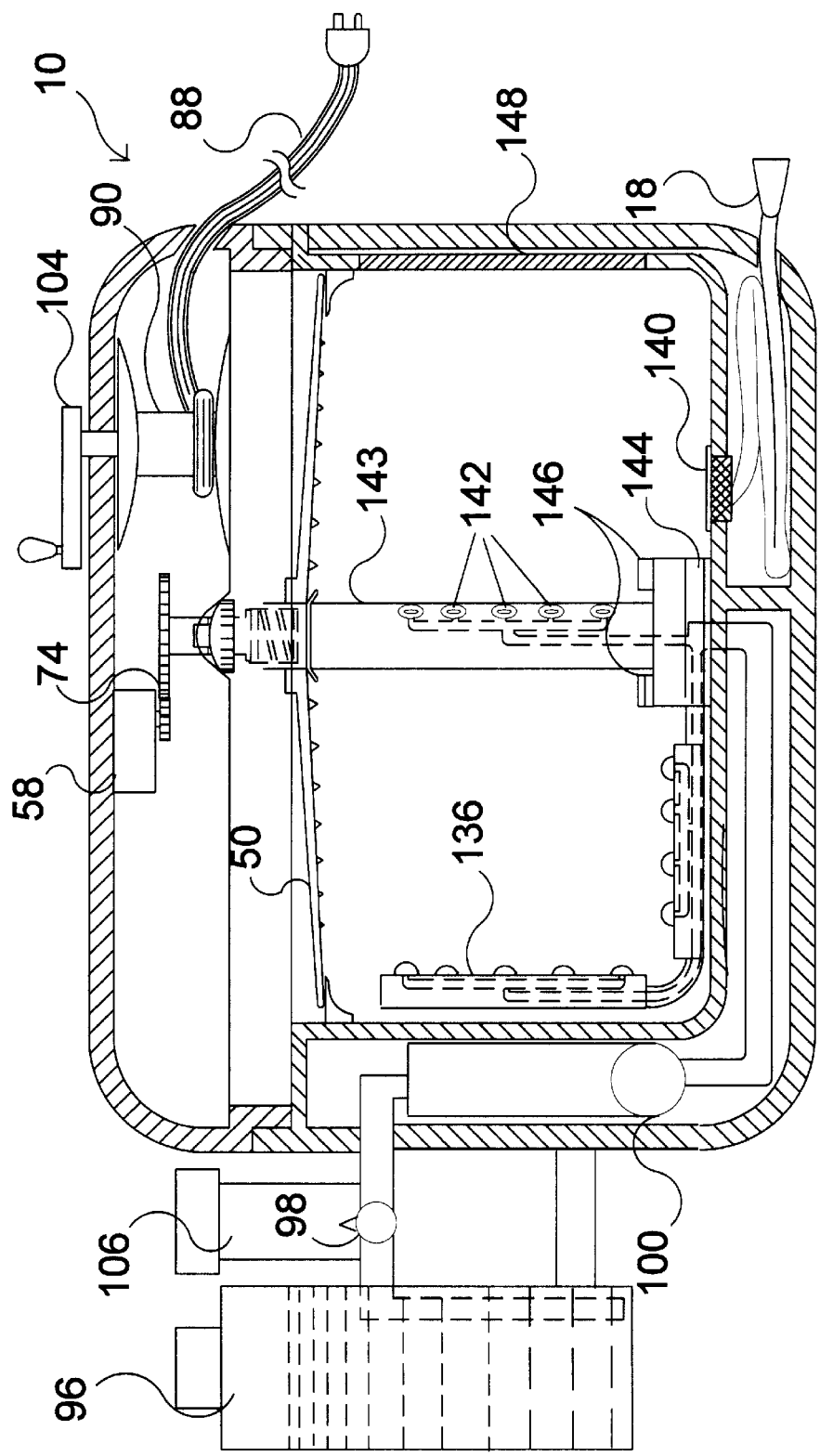
FIG. 10 is a cross-sectional side view of the present invention in use.

Turning to FIG. 10, shown therein is a cross-sectional side view of the present invention 10 demonstrating several possible pressure nozzle configurations including rotating vertical arm 136 and nozzles 142 mounted on shaft 143 and horizontal pressure nozzle arm 138 arrays that could be used in conjunction with a stationary basket or filter element. The macerator 140 could be installed within the drain system to pulverize waste material that might otherwise clog the drain hose 18. The macerator 140 could be particularly useful when the present invention is used in commercial and industrial applications. Also shown are a rotating armature 144, a stationary basket retaining member 146, and a secondary sanitizing means 148. Other elements previously disclosed are also shown.

What is claimed to be new and desired to be protected by Letters Patent is set forth in the appended claims.

I claim:

1. An apparatus for washing various objects with a fluid, comprising:
   a) an outer housing, said housing being a canister, said housing having a top end and a bottom end, said housing being open on said top end;
   b) an inner housing disposed internal said outer housing, said inner housing being a canister, said inner housing having a top end and a bottom end, said inner housing being open on said top end;
   c) means for a first rotatable shaft centrally disposed internal said inner housing, said shaft being generally upright standing;
   d) means for containing the objects to be washed disposed on said means for a first rotatable shaft;
   e) means for connecting said means for containing the objects to said means for a first rotatable shaft;
   f) means for rotating said means for a first rotatable shaft whereby said first rotatable shaft is rotated;
   g) means for introducing at least one fluid internal said inner and outer housing for cleaning the objects;
   h) means for removing the fluid from said inner and outer housing;

i) a cover disposed on said top end of said inner and outer housing so that objects to be washed and fluids are contained within said inner and outer housing; and j) said means for a first rotatable shaft further comprises a cylindrical shaft having a top end and a bottom end, said bottom end of said rotatable shaft being connected to said bottom end of said inner housing by means of a turntable, said turntable further comprising ball bearings for rotational connection of said turntable to said inner housing.

2. The apparatus of claim 1, wherein said top end of said rotatable shaft further comprises a locking flange, said locking flange being spring loaded for axial movement, said top end of said rotatable shaft having threads thereon, said top end of said rotatable shaft further comprising a rotatable seal disposed thereon.

3. The apparatus of claim 2, further comprising a circular splashguard disposed on said top end of said rotatable shaft, said splashguard having a retaining plate for retaining said splashguard onto said rotatable shaft, said top end of said rotatable shaft further comprising an anti-spin flange disposed thereon.

4. The apparatus of claim 3, wherein said means for rotating said means for a rotatable shaft further comprises a drive shaft having a top end and a bottom end, said bottom end having a locking recess thereon for contacting and receiving said locking flange of said top end of said rotational shaft for driving said rotational shaft.

5. The apparatus of claim 4, wherein said means for rotating said means for a rotatable shaft further comprises a handle disposed on said cover for being manually rotated.

6. The apparatus of claim 5, wherein said means for rotating said means for a rotatable shaft further comprises an electric drive motor disposed internal said cover, said drive motor being connected to said rotatable shaft by a gear assembly, said gear assembly further comprising a drive gear disposed on said motor and a differential gear disposed on said drive shaft.

7. The apparatus of claim 6, wherein said cover forms an enclosure containing said drive shaft, further comprising a timer, a switch for said time, an audible alarm, a handle, and a light emitting diode indicator.

8. The apparatus of claim 7, wherein said cover further comprises a motor, said gear assembly, a power cord, and a retractable spool for storing said power cord.

9. The apparatus of claim 8, wherein said means for containing the objects to be washed further comprises a cylindrical basket having a central cylindrical shaft therein, said central cylindrical shaft being disposed onto said first rotatable shaft.

10. The apparatus of claim 9, wherein said means for containing the objects to be washed further comprise a filter element having a central cylindrical shaft therein, said central cylindrical shaft being disposed onto said first rotatable shaft.

11. The apparatus of claim 8, wherein said means for containing the objects to be washed further comprises a paint brush roller having a central cylindrical shaft therein, said central cylindrical shaft being disposed onto said first rotatable shaft.

12. The apparatus of claim 11, wherein said means for connecting said means for containing the objects further comprises said splashguard having interior shaft threads thereon, said interior shaft threads being matingly disposed to said threads on said top end of said first rotatable shaft, said central cylindrical shaft of said means for containing the objects disposed thereinbetween said splashguard and said turntable on said bottom end of said first rotatable shaft.

13. The apparatus of claim 12, wherein said means for introducing at least one fluid internal said inner and outer housing further comprises an inlet hose for delivering fluid, an inlet fitting, a connection for connecting said inlet hose to said inlet fitting and a manifold arm containing at least one fluid spray nozzle for providing a jet spray directed toward the objects to be washed disposed in the center of said housing.

14. The apparatus of claim 13, wherein said manifold arm contains a plurality of nozzles, wherein said manifold is vertically aligned inside said inner housing so that said nozzles are directed toward said rotational shaft.

15. The apparatus of claim 14, wherein said nozzles oscillate to provide an oscillating jet spray.

16. The apparatus of claim 15, wherein said manifold arm is rotatable disposed onto said bottom end of said rotatable shaft, said manifold arm being generally horizontally disposed so that said nozzles are directed generally vertically.

17. The apparatus of claim 16, wherein said manifold arm is vertically disposed laterally spaced apart from said rotatable shaft so that said nozzles are directed generally horizontally.

18. The apparatus of claim 17, wherein said manifold arm is disposed internal said rotatable shaft so that said nozzles are directed generally horizontally away from said rotatable shaft.

19. The apparatus of claim 18, wherein said means for removing fluids further comprises an outlet hose.

20. The apparatus of claim 19, further comprising means for electrically controlling the fluid level internal said inner housing, further comprising a fluid level sensor, an outlet valve, an inlet valve and control means therefor.

21. The apparatus of claim 20, further comprising a strainer disposed in said outlet hose.

22. The apparatus of claim 21, further comprising a macerator disposed in said outlet hose.

23. The apparatus of claim 22, wherein said means for introducing at least one fluid further comprises a cleaning solution dispenser disposed in a wall of said inner and outer housing through which cleaning solution can be input therethrough.

24. The apparatus of claim 23, further comprising a first reservoir for containing cleaning solution disposed in said inlet hose, further comprising a means for metering said cleaning solution into said inlet hose.

25. The apparatus of claim 24, further comprising a second reservoir for containing water disposed in said inlet hose, further comprising a means for mixing said water and said cleaning solution.

26. The apparatus of claim 25, wherein said cover further comprises a control panel for controlling the operation of the apparatus, said control panel having control buttons thereon, said buttons for controlling the operation of the apparatus.

* * * * *